Figure 1:
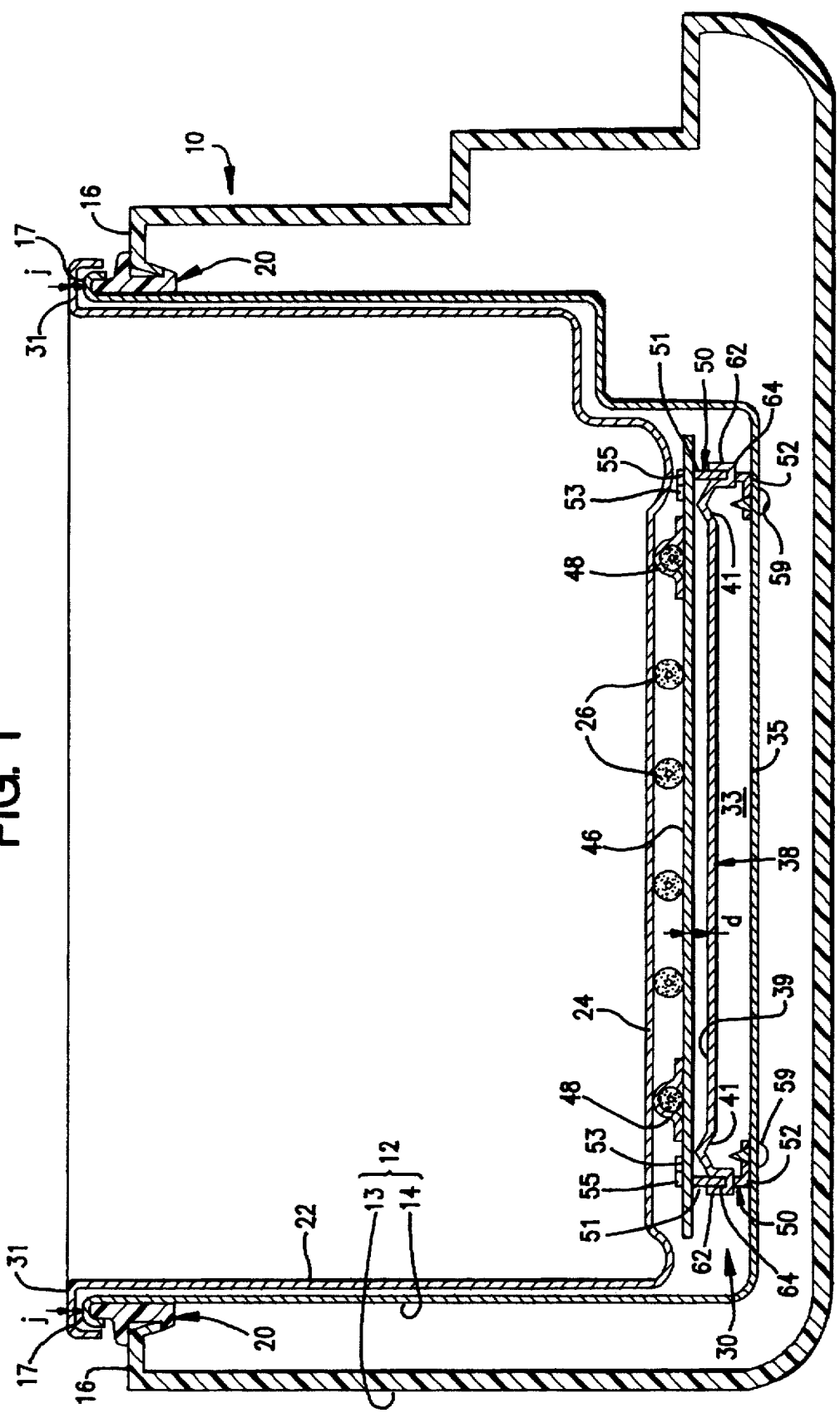

United States Patent [19]
Bois et al.

[11] Patent Number: 5,794,522
[45] Date of Patent: Aug. 18, 1998

[54] ELECTRICAL COOKING APPARATUS, IN PARTICULAR DEEP FAT DRYER

[75] Inventors: Bernard Bois, Caen; Guy Collas, Ifs, both of France

[73] Assignee: Moulinex S.A., Paris, France

[21] Appl. No.: 832,341

[22] Filed: Apr. 11, 1997

[51] Int. Cl.[6] .............. A47J 27/00; A47J 36/38; A47J 37/12; H05B 6/76
[52] U.S. Cl. .............. 99/330; 99/401; 99/403; 99/447; 219/429; 219/432; 219/441; 219/442
[58] Field of Search ............. 99/330–333, 336, 99/403–418, 401, 447; 126/360 R, 390, 391; 219/429–435, 436–442, 530, 462; 210/167, DIG. 8

[56] References Cited

U.S. PATENT DOCUMENTS

| | | | |
|---|---|---|---|
| 2,850,616 | 9/1958 | Hatch | 219/433 |
| 3,489,880 | 1/1970 | Bloomfield | 219/436 |
| 4,505,193 | 3/1985 | Mariotti | 99/330 |
| 4,530,717 | 7/1985 | Bohrer, Jr. et al. | 55/DIG. 36 |
| 4,539,898 | 9/1985 | Bishop et al. | 99/407 |
| 4,668,390 | 5/1987 | Hurley et al. | 210/167 |
| 4,995,312 | 2/1991 | Leiros | 99/411 |
| 5,165,329 | 11/1992 | Jocob et al. | 99/407 |
| 5,297,474 | 3/1994 | Tabuchi | 210/DIG. 8 |
| 5,367,949 | 11/1994 | Nitschke et al. | 55/DIG. 36 |
| 5,379,684 | 1/1995 | Ettridge | 99/413 |
| 5,452,648 | 9/1995 | Hohler et al. | 99/408 |
| 5,584,234 | 12/1996 | Baillieul et al. | 99/403 |

*Primary Examiner*—Timothy F. Simone
*Attorney, Agent, or Firm*—Young & Thompson

[57] ABSTRACT

Electric cooking apparatus comprising an insulating enclosure (12) which has spaced inner and outer shells (13, 14). A cooking vessel (22) is mounted removably in the enclosure at a distance from the inner shell (14). An electric heating device (30) comprising a sheathed heating resistance (26) extends flat and in direct contact with the bottom (24) of the vessel (22). The heating device comprises a heat reflector (38) mounted fixedly on the inner shell (14) and disposed at a small distance (d) below the resistance (26) so as to concentrate the thermal radiation of the resistance over all the bottom of the vessel. The apparatus is of particular utility when embodied in an electric deep fat fryer.

8 Claims, 2 Drawing Sheets

ELECTRICAL COOKING APPARATUS, IN PARTICULAR DEEP FAT DRYER

This application corresponds to French application 96/04475 of Apr. 11, 1996, the disclosure of which is incorporated herein by reference.

The present invention relates to electric cooking apparatus, particularly but not exclusively to electrical deep fat fryers, which comprise an insulating enclosure with two shells spaced from each other, respectively an outer and an inner, a food cooking vessel which is mounted removably in the chamber and at a distance from the inner shell of said enclosure, and an electrical heating device mounted fixedly in the space separating the bottom of the vessel from the bottom of the interior shell of the enclosure.

It relates more particularly to apparatus of this type in which the electrical heating device comprises a sheathed heating resistance which extends flat and on which comes into substantially direct contact all the bottom of the vessel.

In known cooking apparatus of this type, the inner shell of the enclosure is made of a metallic material, such that the sheathed resistance in direct contact with the bottom of the removable vessel ensures heating of the latter both by conduction and by radiation after reflection on the bottom of the inner shell of the chamber, which bottom of the inner shell of the chamber constitutes itself a heat reflector. However, in this type of apparatus, the sheathed heating resistance is located at a relatively great distance from the bottom forming the heat reflector of the inner shell of the chamber, such that the heating radiation of the sheathed resistance is insufficiently localized over all the bottom of the vessel, thus leading to relatively mediocre heat utilization between the resistance and the vessel, and correspondingly, the increase in the temperature of the cooking vessel is relatively slow, which thus increases the cooking time for the foods as well as the heating time of the oil in the case of deep fat fryers.

The invention has particularly for its object to overcome these drawbacks and to provide an electric cooking apparatus, of the type described above, in which the thermal output between the sheathed resistance and the removable vessel will be optimum.

According to the invention, the heating device comprises moreover a heat reflector mounted fixedly on the inner shell of the enclosure and disposed at a short distance below the sheathed resistance so as to concentrate the thermal radiation of the resistance over all the bottom of the vessel.

Thus, the arrangement at a small distance of the thermal reflector relative to the sheathed heating resistance permits obtaining heating radiation which is a maximum over all the bottom of the vessel, thereby permitting optimizing the heat exchange by conduction and by radiation between the sheathed resistance and the vessel. As a result, the increase in temperature of the cooking vessel is particularly rapid.

Preferably, the thermal reflector is of a cold rolled steel core and clad with aluminum on each of its surfaces. Such an embodiment offers both the characteristics of strength of the steel and reflectivity of the aluminum.

Figure 2:
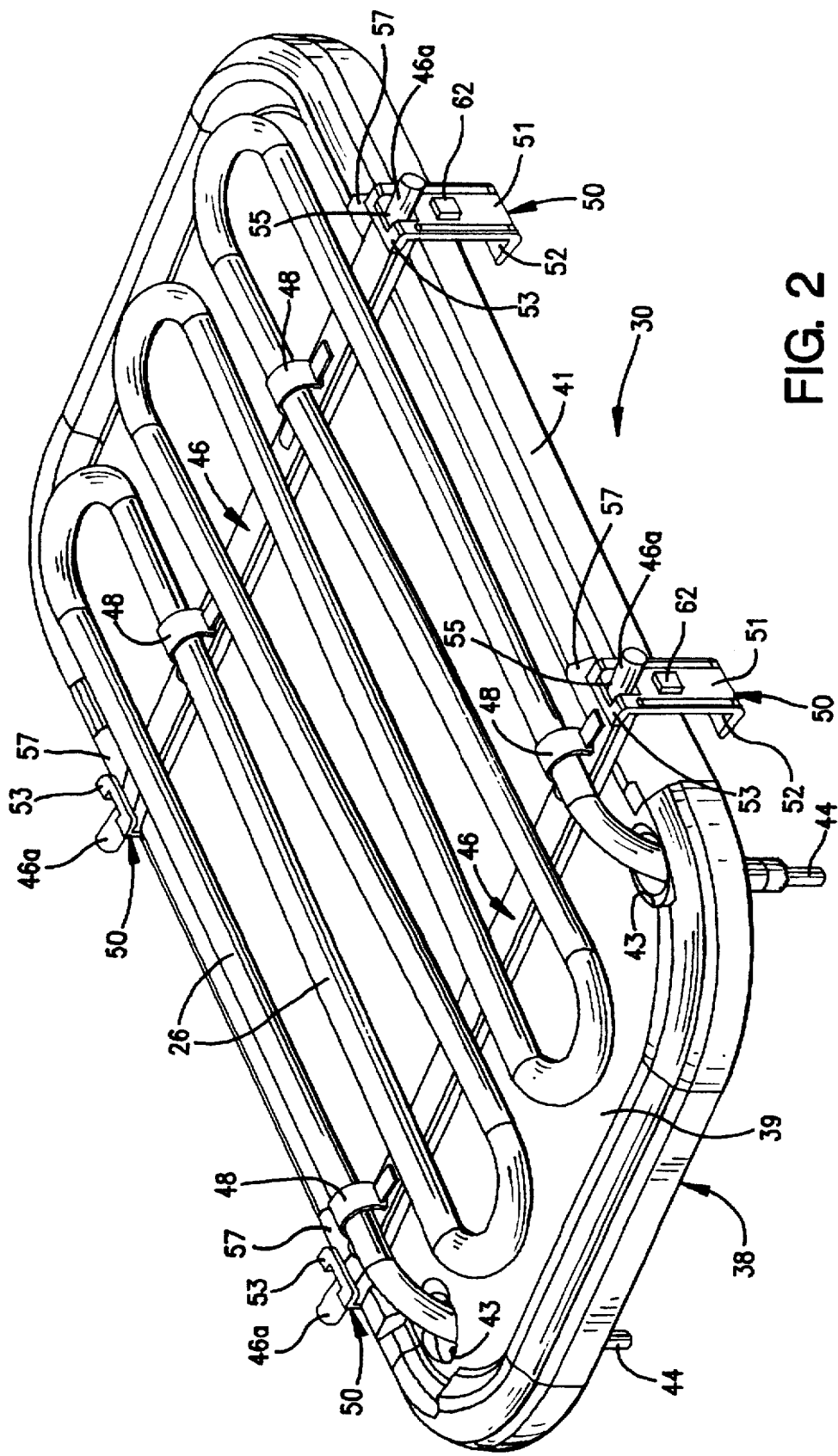

The characteristics and advantages of the invention will become apparent from the description which follows, by way of non-limiting example, with reference to the accompanying drawings, in which:

FIG. 1 is a simplified schematic cross-sectional view of an electric cooking apparatus, such as a deep fat fryer, according to the invention; and FIG. 2 is a perspective view, on an enlarged scale, of the heating device used in the cooking apparatus of FIG. 1.

In the embodiment shown in FIG. 1, the electric cooking apparatus 10 is an electric deep fat fryer, for example of generally rectangular shape, comprising a rectangular insulating enclosure 12 which is double walled, namely, comprising an external shell 13 made preferably of plastic material such as for example polypropylene, and an inner shell 14 made of a metallic material, which are spaced from each other over all their surfaces and which are assembled with each other by their upper edges 16 and 17, respectively, by means of a plurality of supports 20 of a thermally-insulating material resistance to the temperatures of use of the deep fat fryer. For a detailed description of these assembly supports 20, refer to French patent 2 679 751.

The electric deep fat fryer 10 of FIG. 1 also comprises a rectangular vessel 22 of a metallic material, mounted removably in the enclosure 12 and being surrounded at a distance on all its sides by the inner shell 14 of the enclosure, and adapted to contain an oil bath (not shown). The vessel 22 comprises a bottom 24 which, during its mounting in the enclosure 12, comes to rest in direct contact on a sheathed heating resistance 26 extending flat and forming a portion of an electric heating device of the vessel, designated by the general reference numeral 30, which will be described in detail hereinafter. As shown in FIG. 1, the upper edge 31 of the vessel 22 in mounted position extends above, by a predetermined distance i, the upper edge 17 of the inner shell 14 of the enclosure 12, such that the vessel 22 is simply maintained by resting on the flat sheathed resistance 26.

As is seen in FIG. 1, the electric heating device 30 is mounted fixedly in the space 33 which separates the bottom 24 of the vessel 22 from the bottom 35 of the inner shell 14 of the enclosure. In operation, the sheathed resistance 26 of the heating device 30 thus ensures heating of the vessel 22 by conduction and radiation.

In a known manner, the deep fat fryer also comprises means for thermal regulation (not shown).

According to the invention, the heating device 30 comprises moreover a thermal reflector 38 mounted fixedly on the inner shell 14 of the enclosure 12 and disposed at a small distance below the sheathed resistance 26 so as to concentrate the thermal radiation of the resistance 26 over all the bottom 24 of the vessel 22.

As shown in FIG. 2, in one embodiment, the sheathed resistance 26 has a serpentine shape adapted to promote its thermal contact over all the length and all the width of the bottom 24 of the vessel 22 of rectangular shape in this example.

As to FIGS. 1 and 2, the reflector 38 is made of a metallic material, of generally rectangular shape and comprises a flat bottom wall 39 which extends below and at a small distance d (FIG. 1), of the order of 3 millimeters, from the sheathed resistance 26, and a side wall 41 bent upwardly and surrounding at a distance the sheathed resistance 26.

It will be understood that, thanks to the heat reflector 38 located at a small distance d from the sheathed resistance 26, in the course of frying, the heat radiation from the resistance 26 at a temperature of the order of 850° C. is perfectly localized over all the bottom 24 of the vessel 22, thereby permitting obtaining overall heat output between the resistance 26 and the vessel 22 which is considered as optimum, and as a result, the increase of temperature of the oil bath is particularly rapid.

Preferably, the heat reflector 38 is made of a cold rolled steel core clad with aluminum over all its surfaces. This embodiment desirably combines the strength of the steel and the reflectivity of the aluminum.

In the embodiment shown in FIG. 2, the bottom wall 39 of the reflector 38 comprises two large openings 43 which are traversed respectively by the two ends 44 of the resistance 26 passing downwardly therethrough, this latter being connected to an electrical connection block (not shown).

In this example, the sheathed resistance 26 is maintained fixedly on cross pieces forming a support 46, two in number in this case, by means of welded straps 48. The two cross pieces 46 extend orthogonally to the longitudinal axis of the reflector 38 and are constituted by cylindrical metallic rods made preferably on stainless steel and are each supported freely at their two free ends 46a by support members 50 disposed two by two in opposition. The support members 50 are constituted by metallic straps, four in number in the illustrated embodiment, made preferably of stainless steel, and each having a vertical U-shaped turned toward the side wall 41 of the reflector 38 and which comprise a core 51 applied fixedly against the external surface of the lateral wall 41 of the reflector, and two wings, respectively a lower wing 52 and an upper wing 53. As shown in FIG. 2, each strap 50 comprises an opening 55 which is provided on opposite sides of the junction between the core 51 and the upper wing 53 of the strap and in which rests freely one of the two ends 46a of the cross piece 46 via a wide recess 57 provided on the upper edge of the side wall 41 of the reflector 38. The lower wing 52 of each strap 50 is anchored on the bottom 35 of the lower shell 14 of the enclosure 12 by any suitable securement means, such for example as screws 59, see FIG. 1.

It will be understood that the two cross pieces 46 that fixedly maintain the sheathed resistance 26, permit expansion of the resistance 26 in a horizontal plane because they can each move freely in the recesses 57 of the reflector 38 and the recesses 55 of the two opposed straps 50.

As to FIGS. 1 and 2, the side wall 41 of the heat reflector 38 comprises securement members 62 adapted to coact with the straps 50 and which are constituted by tongues, four in number in the example chosen, distributed over the external periphery of the side wall 41 of the reflector and each passing horizontally through a recess 64 (FIG. 1) provided in the core 51 of the corresponding strap 50, each tongue 62 being then bent upwardly by clamping against the external surface of the core 51 of the corresponding strap, as is shown in FIGS. 1 and 2.

With reference to FIG. 2, the dimensions of the openings 43, of the recesses 55 and of the recesses 57 are such that the reflector 38 is never in contact with the sheathed resistance 26 nor with the cross pieces 46 for fixedly securing the resistance, which actually makes the reflector 38 totally independent. This is particularly advantageous in the case of deformation of the reflector 38, the geometry of the sheathed resistance 26 than not being in any way affected, and because of this, any interference with the heating of the cooking vessel is prevented.

Moreover, the fact that the straps 50 fixed on the bottom 35 of the inner metallic shell 14 are in stainless steel and maintain the reflector 38 and the cross pieces 46 solely by the edge of the latter, advantageously permits limiting the points of thermal contact so as to avoid any substantial heat transfer by conduction over the inner shell 14 of the enclosure 12.

There is thus provided by the invention an electric deep fat fryer with removable vessel utilizing a heating device which is particularly advantageous both from the point of view of its thermal efficiency and from the point of view of its particular assembly.

The invention can be applied to other electrical cooking apparatuses than deep fat fryers, such as pressure cookers, slow cookers, electric stoves and the like.

What is claimed is:

1. In an electric cooking apparatus comprising an insulating enclosure (12) having two shells spaced from each other comprising an external shell (13) and an inner shell (14), a food cooking vessel (22) removably mounted in the enclosure (12) at a distance from the inner shell (14), and an electric heating device (30) mounted fixedly in a space (33) separating a bottom (24) of the vessel (22) from a bottom (35) of the inner shell (14) and comprising a sheathed heating resistance (26) which extends flat and into which comes in direct contact substantially all the bottom (24) of the vessel (22); the improvement wherein the heating device (30) comprises a heat reflector (38) mounted fixedly on the inner shell (14) and disposed at a small distance (d) below the sheathed resistance (26) so as to concentrate the thermal radiation of the resistance over all the bottom (24) of the vessel (22).

2. Electric cooking apparatus according to claim 1, wherein the heat reflector (38) has a cold rolled steel core and is clad with aluminum on each of its surfaces.

3. Electric cooking apparatus according to claim 1, wherein the heat reflector (38) comprises a flat bottom wall (39) having two openings (43) traversed respectively by two ends (44) of the sheathed resistance (26), and a side wall (41) upwardly deformed which comprises securement members (62) coacting with support members (50) secured on the bottom (35) of the inner shell (14).

4. Electric cooking apparatus according to claim 3, wherein the securement members (62) comprise a plurality of horizontal tongues distributed about the external periphery of the side wall (41) of the heating reflector (38), and the support members (50) are constituted by a plurality of straps, of a number equal to the number of said tongues, applied against the external surface of the side wall (41) of the heat reflector (38) and each comprising a recess (64) through which is engaged a corresponding tongue (62), said tongue (62) being bent by gripping against the external surface of the strap (50).

5. Electric cooking apparatus according to claim 4, wherein the straps (50) are disposed two by two in opposition to each other, and the sheathed resistance (26) is secured on cross pieces forming a support (46) associated each with two opposite straps (50) and each comprising two free ends (46a) each resting freely in a recess (55) provided in the associated strap (50) and being located above the recess (64).

6. Electric cooking apparatus according to claim 5, wherein the cross pieces (46) are constituted by rods of stainless steel.

7. Electric cooking apparatus according to claim 4, wherein each strap (50) is of stainless steel.

8. Electric cooking apparatus according to claim 1, wherein the vessel (22) is of rectangular shape, the heat reflector (38) has substantially rectangular shape and the sheathed resistance (26) is of serpentine form promoting its thermal contact over all the length and all the width of the bottom (24) of the rectangular vessel (22).

* * * * *

UNITED STATES PATENT AND TRADEMARK OFFICE
CERTIFICATE OF CORRECTION

PATENT NO. : 5,794,522
DATED : August 18, 1998
INVENTOR(S) : Bernard BOIS et al.

It is certified that error appears in the above-indentified patent and that said Letters Patent is hereby corrected as shown below:

On the title page and column 1, item [54] change

"DRYER" to --FRYER--.

On the title page, insert Item [30] as follows:

--[30] Foreign Application Priority Data

April 11, 1996 [FR] France . . . .96/04475--.

Signed and Sealed this

Twenty-seventh Day of October, 1998

Attest:

BRUCE LEHMAN

Attesting Officer    Commissioner of Patents and Trademarks